United States Patent
Liu et al.

(10) Patent No.: US 12,211,229 B2
(45) Date of Patent: Jan. 28, 2025

(54) METHOD, DEVICE, AND SYSTEM FOR DETECTING AND TRACKING OBJECTS IN CAPTURED VIDEO USING CONVOLUTIONAL NEURAL NETWORK

(71) Applicant: Hong Kong Applied Science and Technology Research Institute Company Limited, Hong Kong (HK)

(72) Inventors: Shangping Liu, Hong Kong (HK); Lu Wang, Hong Kong (HK); Ziyu Ni, Hong Kong (HK); Fengfeng Liang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 463 days.

(21) Appl. No.: 17/834,900

(22) Filed: Jun. 7, 2022

(65) Prior Publication Data

US 2023/0394697 A1    Dec. 7, 2023

(51) Int. Cl.
*G06T 7/70*    (2017.01)
*G06T 7/20*    (2017.01)

(52) U.S. Cl.
CPC .................. *G06T 7/70* (2017.01); *G06T 7/20* (2013.01); *G06T 2207/10016* (2013.01); *G06T 2207/20084* (2013.01); *G06T 2207/30204* (2013.01)

(58) Field of Classification Search
CPC .. G06T 7/70; G06T 7/73; G06T 7/246; G06T 7/20; G06T 7/251; G06T 2207/10016;
(Continued)

(56) References Cited

U.S. PATENT DOCUMENTS

| 10,957,043 | B2 | 3/2021 | Hussain et al. |
| 11,100,633 | B2 | 8/2021 | Ngo Dinh et al. |

(Continued)

FOREIGN PATENT DOCUMENTS

| CN | 111311635 A | 6/2020 |
| CN | 111340756 A | 6/2020 |

(Continued)

OTHER PUBLICATIONS

International Search Report and Written Opinion of corresponding PCT application No. PCT/CN2022/105542 mailed on Dec. 27, 2022.
S. Menon et al., "How commonly is upper gastrointestinal cancer missed at endoscopy? A meta-analysis", Endoscopy International Open, vol. 2, No. 2, 2014, pp. E46-E50.
(Continued)

*Primary Examiner* — Sumati Lefkowitz
*Assistant Examiner* — Michael Adam Shariff
(74) *Attorney, Agent, or Firm* — Idea Intellectual Limited; Margaret A. Burke; Sam T. Yip

(57) ABSTRACT

A method for detecting and tracking target object in a captured video using convolutional neural network (CNN) is provided. The method includes: inputting image data into a detecting model to generate detection results, wherein the detecting model is constructed by the CNN; inputting the image data into tracking models to generate tracking results; performing detection score enhancement operation according to the detection results and the tracking results to obtain enhanced detection results; matching the enhanced detection results and the tracking results by a matching operation; processing matched results and unmatched target detection results and unmatched target tracking results; and selectively updating the tracking models using tracking reliability estimation according to the matched results.

15 Claims, 12 Drawing Sheets

(58) Field of Classification Search
CPC . G06T 2207/10068; G06T 2207/20084; G06T 2207/20081; G06T 2207/30204
See application file for complete search history.

(56) References Cited

U.S. PATENT DOCUMENTS

| | | | |
|---|---|---|---|
| 11,113,538 | B2 | 9/2021 | Oami et al. |
| 2019/0130580 | A1* | 5/2019 | Chen .................. G06V 10/82 |
| 2020/0097769 | A1 | 3/2020 | Lipchin et al. |
| 2021/0004967 | A1 | 1/2021 | Akiyama |

FOREIGN PATENT DOCUMENTS

| | | | |
|---|---|---|---|
| CN | 111915573 | A | 11/2020 |
| CN | 113313736 | A | 8/2021 |
| EP | 2259221 | A1 | 12/2010 |
| WO | 2021208251 | A1 | 10/2021 |

OTHER PUBLICATIONS

Jeroen C. van Rijn et al., "Polyp Miss Rate Determined by Tandem Colonoscopy: A Systematic Review", American Journal of Gastroenterology, vol. 101, No. 2 , 2006, pp. 343-350.

M. Danelljan et al., "Beyond Correlation Filters: Learning Continuous Convolution Operators for Visual Tracking", ECCV 2016, pp. 472-488.

Kaiming He et al., "Deep Residual Learning for Image Recognition", Proceedings of the IEEE Conference on Computer Vision and Pattern Recognition (CVPR), 2016, pp. 770-778.

Martin Danelljan et al., "ECO: Efficient Convolution Operators for Tracking", Proceedings of the IEEE Conference on Computer Vision and Pattern Recognition (CVPR), 2017, pp. 6638-6646.

Pytracking, https://github.com/visionml/pytracking.

Xingyi Zhou et al., "Objects as Points", arXiv:1904.07850v2 [cs. CV], Apr. 25, 2019.

* cited by examiner

METHOD, DEVICE, AND SYSTEM FOR DETECTING AND TRACKING OBJECTS IN CAPTURED VIDEO USING CONVOLUTIONAL NEURAL NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to techniques of object detecting and tracking in a captured video. More particularly, the present invention relates to methods, devices, and systems for detecting and tracking objects in captured video using convolutional neural network.

BACKGROUND OF THE INVENTION

Gastrointestinal endoscopy is a method commonly used to identify gastric and colorectal cancers. Endoscopically detecting gastric and colorectal cancer at the earliest possible stage is the single most effective way to reduce cancer mortality. A study, S. Menon and N. Trudgill, "*How commonly is upper gastrointestinal cancer missed at endoscopy? A meta-analysis,*" Endosc Int Open, vol. 2, no. 2, pp. E46-E50, 2014, of a meta-analysis of 3,787 patients with upper gastrointestinal (UGI) cancer shows that 11.3% of UGI cancers are missed at endoscopy up to three years before diagnosis. Moreover, the missed polyp rate during colonoscopy has been reported as approximately 20% (van Rijn, J. C. et al. *Polyp miss rate determined by tandem colonoscopy: a systematic review*. Am. J. Gastroenterol. 101, 343-350, 2006).

A lesion detector based on machine learning models, when trained on qualified images, can process and interpret qualified endoscopic images very effectively. However, directly applying a lesion detector to endoscopic videos may produce unreliable results as artifacts are very common in the endoscopic videos such as over- and under-exposure, motion blur, video defocus, fluid, bubbles, specular reflections, and floating objects.

It is essential to develop an artificial intelligence algorithm to find early gastric and colorectal cancer and help prevent missed lesions during endoscopy, especially by detecting and tracking a lesion (the target object) during video endoscopy in real time.

SUMMARY OF THE INVENTION

In accordance to one aspect of the present invention, a computer-implemented method for detecting and tracking target object in a captured video using convolutional neural network (CNN) by a video monitoring device, comprising: generating, by a processor of the video monitoring device, image data according to an image frame of the captured video; inputting, by the processor, the image data into a detecting model to generate zero or more detection results, wherein the detecting model is constructed by the CNN; inputting, by the processor, the image data into zero or more tracking models to generate zero or more tracking results, wherein the tracking models use a part of the CNN; selecting, by the processor, zero or more target detection results having first detection scores higher than a first detection threshold ($T_l$) from the detection results; selecting, by the processor, zero or more target tracking results having first tracking scores higher than a first tracking threshold ($T_{corr}$) from the tracking results; performing, by the processor, a detection score enhancement operation to generate enhanced detection results according to the target detection results and the tracking results; selecting, by the processor, zero or more target enhanced detection results having second detection scores higher than a second detection threshold ($T_m$) from the enhanced detection results; performing, by the processor, a matching operation on the target enhanced detection results and the target tracking results to generate matching outcomes, wherein the matching outcomes comprises zero or more matched results and zero or more unmatched target detection results and zero or more unmatched target tracking results, wherein each of the matched results has a pair of matched target enhanced detection result and target tracking result, wherein the target object in the displayed image frame is marked according to the generated matching outcomes.

In accordance with another aspect of the present invention, a video monitoring device for detecting and tracking target object in a captured video using a convolutional neural network (CNN) is provided, and the video monitoring device includes one or more processors configured to execute machine instructions to implement the method described above.

In accordance with another aspect of the present invention, a system for detecting and tracking target object in a video captured by a video monitoring device of the system using a CNN is provided, and a server of the system includes one or more processors configured to execute machine instructions to implement the method described above.

BRIEF DESCRIPTION OF THE DRAWINGS

Embodiments of the invention are described in more details hereinafter with reference to the drawings, in which.

DETAILED DESCRIPTION

In the following description, methods, electronic devices, and systems for detecting and tracking target objects in video endoscopy using convolutional neural networks (CNNs) and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
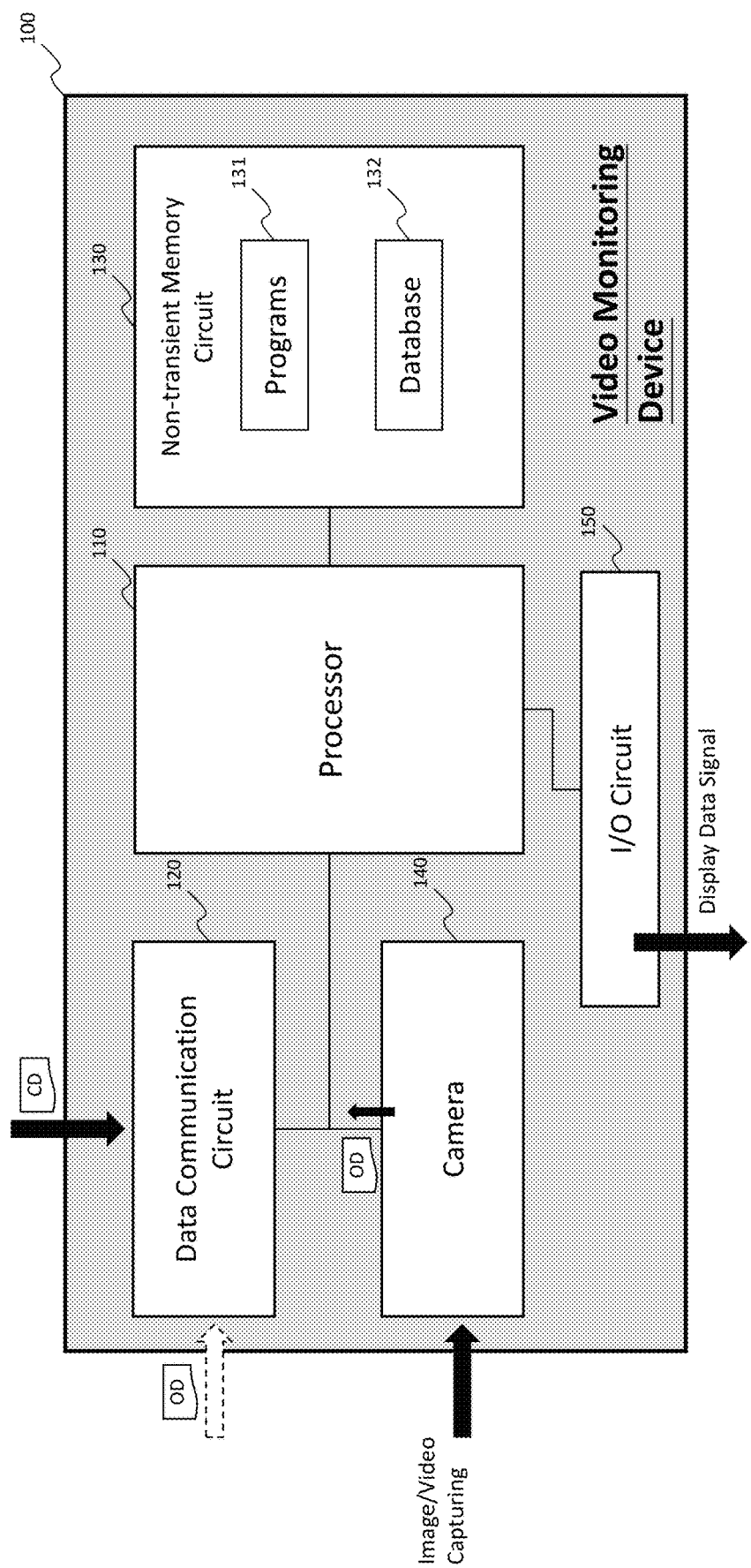
FIG. 1 depicts a block diagram illustrating a video monitoring device in accordance with one embodiment of the present invention.

Referring to FIG. 1 for the following description: In accordance with various embodiments of the present invention, a video monitoring device 100 for detecting and tracking a target object in a captured video using a CNN includes a processor 110, a data communication circuit 120, a non-transient memory circuit 130, and a camera 140. In the embodiment, the video monitoring device 100 is an electronic device, such as a video endoscopy device, a drone having a camera, or a traffic monitoring camera.

The data communication circuit 120 is configured to establish a network connection with other electronic devices (i.e., a cloud server or backend server). The video monitoring device 100 can receive control data CD or object data OD from other electronic devices via the established network connection. The control data CD may comprise data for training the tracking model and detecting model, data of the trained detecting model, data of the determined detecting/tracking results and auxiliary data. The object data OD, for example, is image data or video data comprising a plurality of image frames which are inputted to the video monitoring device to detect and track possible target object (s) in the image frames.

The camera 140 is configured to capture images/video, which are generated as image data (object data OD) and transmit to the processor 110.

The I/O circuit 150 is wired or wirelessly electrically connected to, for example, a touch screen or other suitable devices for image/video display. In one embodiment, the processor 110 analyzes the object data OD to obtain result data and instructs the I/O circuit 150 to transmit the display data signal for displaying the image frames and the mark(s) corresponding to the target object according to the result data.

Figure 2:
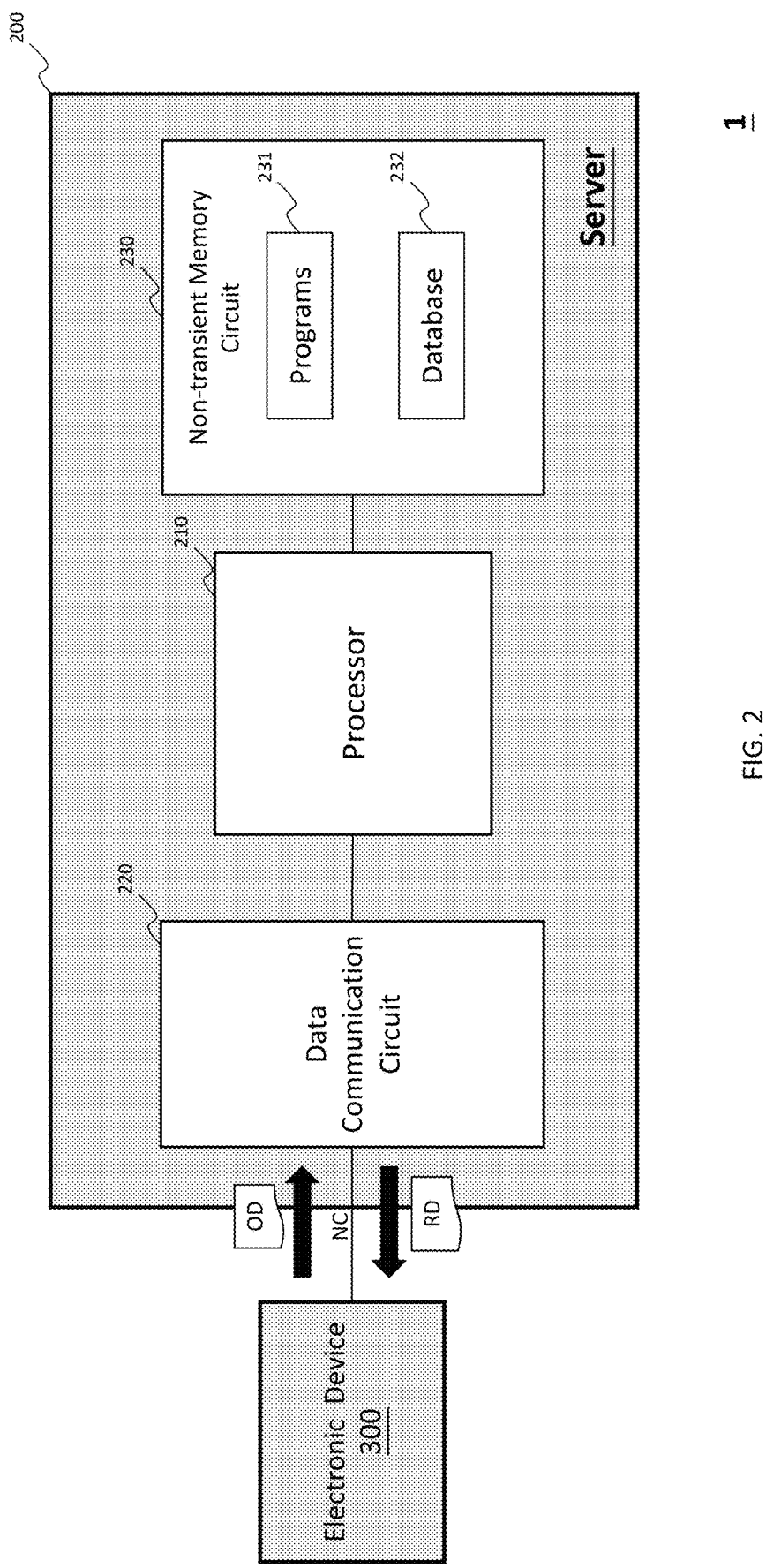
FIG. 2 depicts a block diagram illustrating a system in accordance with one embodiment of the present invention.

In another aspect, a system for detecting and tracking target object in a captured video using a CNN is provided. Referring to FIG. 2, the system 1 includes a video monitoring device 100 and a server 200. The server 200 includes a processor 210, a data communication circuit 220 and a non-transient memory circuit 230. The data communication circuit 220 is configured to establish the network connection NC with the video monitoring device 100.

The non-transient memory circuit 130/230 is configured to store programs 131/231(or machine instructions 131/231) and to host the database 132/232. The database 132/232 may be used to store the trained detecting model(s) (also known as detector(s)), tracking model(s) (also known as tracker(s)), object data OD, control data CD, and/or analysis results (e.g., generated detection results and tracking results, also known as result data RD).

The processor 110/210 executes the machine's instructions 131/231 to implement methods provided by the presented disclosure. The aforementioned detecting model and tracking model are executed by the processor 110/210.

In an embodiment, the server 200 analyzes the received object data OD and sends the result data RD to a further electronic device 300 for displaying the mark(s) corresponding to the target object according to the result data RD. The electronic device 300 can be, for example, a computer, a monitoring camera, etc.

The target object is an image object of the image data that the electronic server is seeking to search for, locate and mark in the image frame. For example, in the field of video endoscopy, the target object is a lesion in the video frame; in traffic monitoring, the target object may be a vehicle, pedestrian, other types of moving object.

The video monitoring device 100 is the exemplary embodiment for explaining the provided method.

Figure 3A:
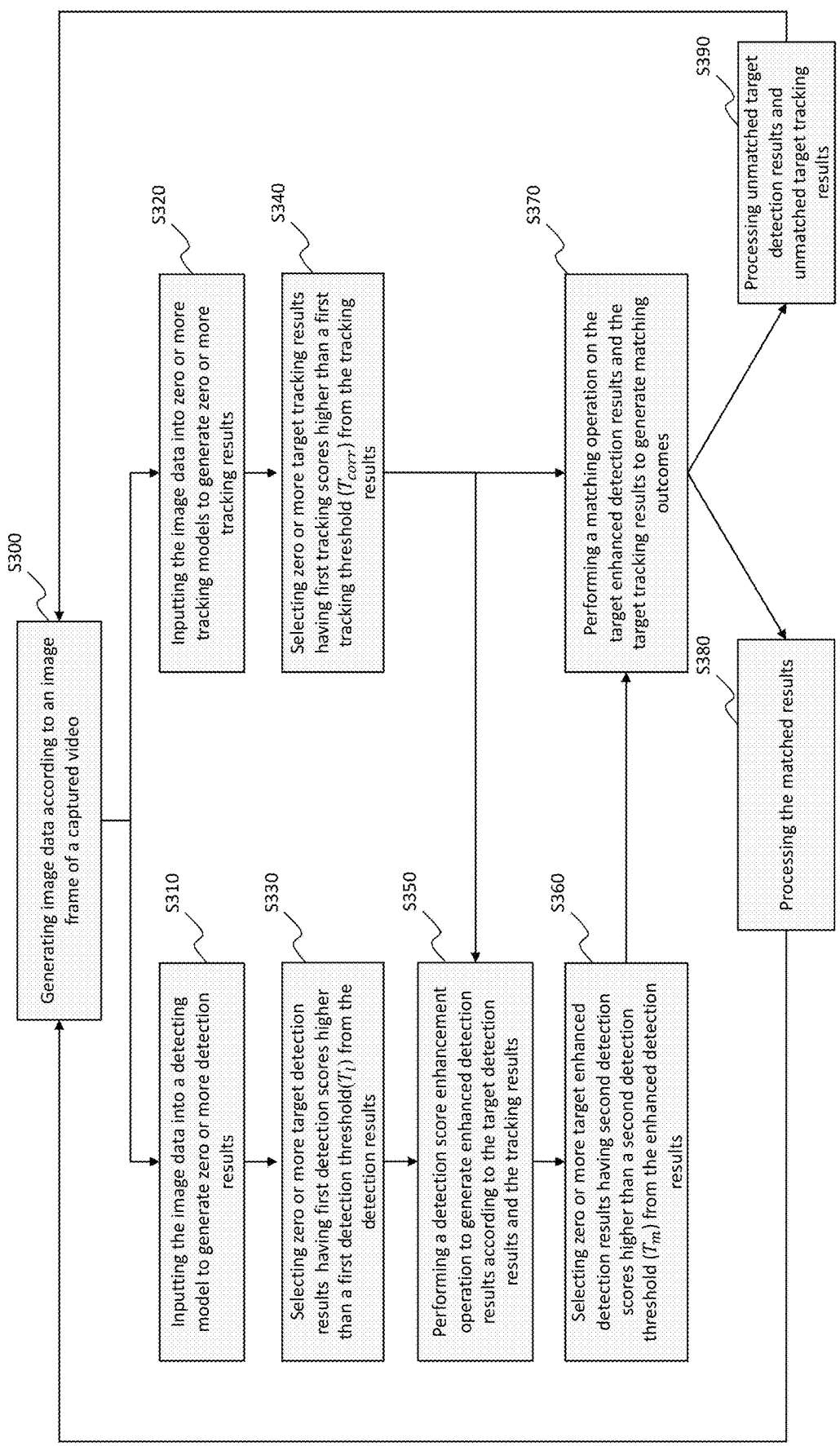
FIG. 3A depicts a flowchart of detecting and tracking target object in captured video.

Referring to FIG. 3A, in step S300 the camera 140 generate image data (e.g., object data) according to an image frame of a captured video. The image data is sent to the processor 110.

In step S310, the processor 110 inputs the image data into a detecting model to generate zero or more detection results. The step of inputting the image data into the detecting model to generate the detection results includes: inputting the image data to the CNN to obtain one or more features of the image frame; determining, according to the features, zero or more detect mark positions, detection scores and zero or more target objects' types; generating the detection results according to the detect mark positions and the target objects' types, wherein each of the detection result includes a corresponding detect mark position and corresponding tag information, wherein the tag information includes the target object's type of the corresponding detection result. The target object's type can be determined from preset object types. The processor 110 can instruct the I/O circuit 150 to display the target object's type next to the detection mark according to the tag information.

Figure 3B:
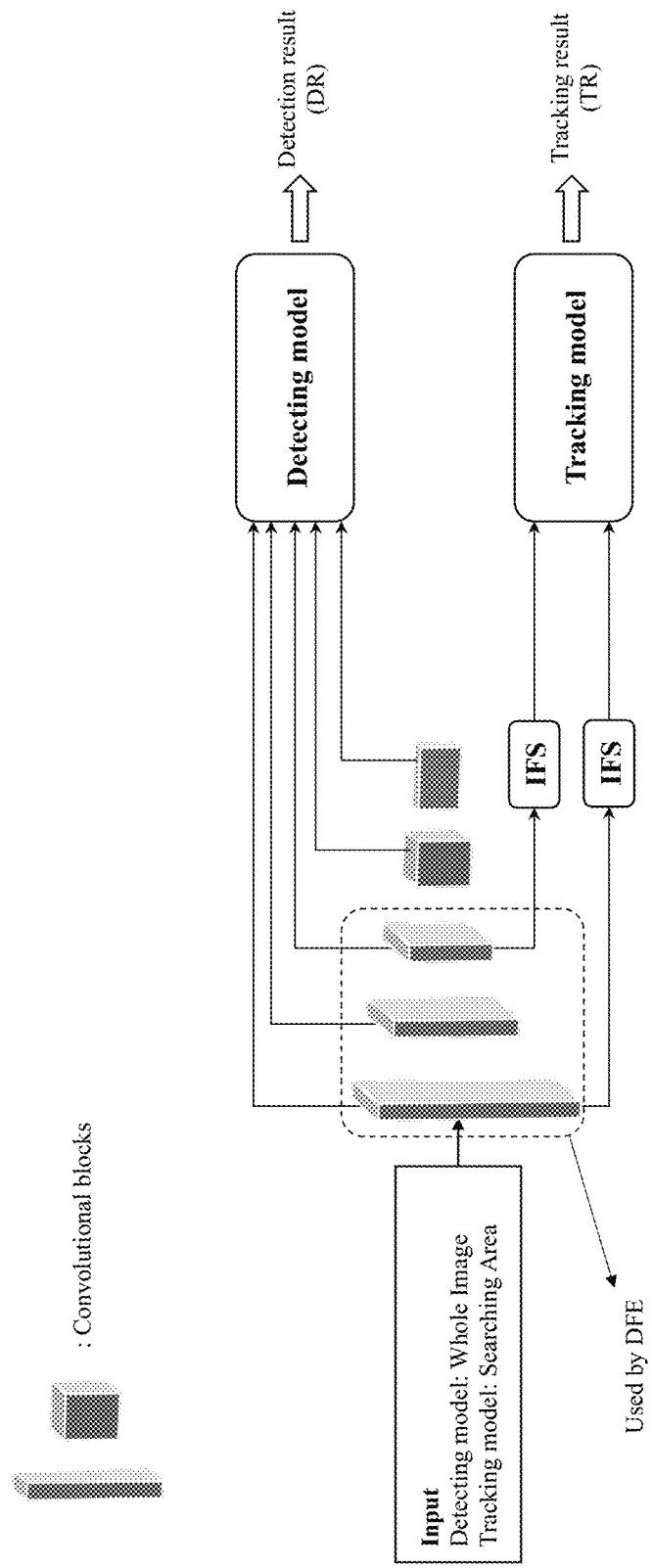
FIG. 3B depicts a schematic diagram of the structure of the CNN used by the detecting model and the tracking model.

Specifically, referring to FIG. 3B, the neural network structure of the detecting model includes M convolutional blocks. In a preferred embodiment, M is 5. Each of the convolutional blocks includes: one or more convolutional layers and one or more activation functions. In a preferred embodiment, a residual block is used.

The M convolutional blocks and the detecting model are trained by a labelled target object dataset and hence can guarantee a strong representation capability to describe the target object in the video.

Figure 3C:
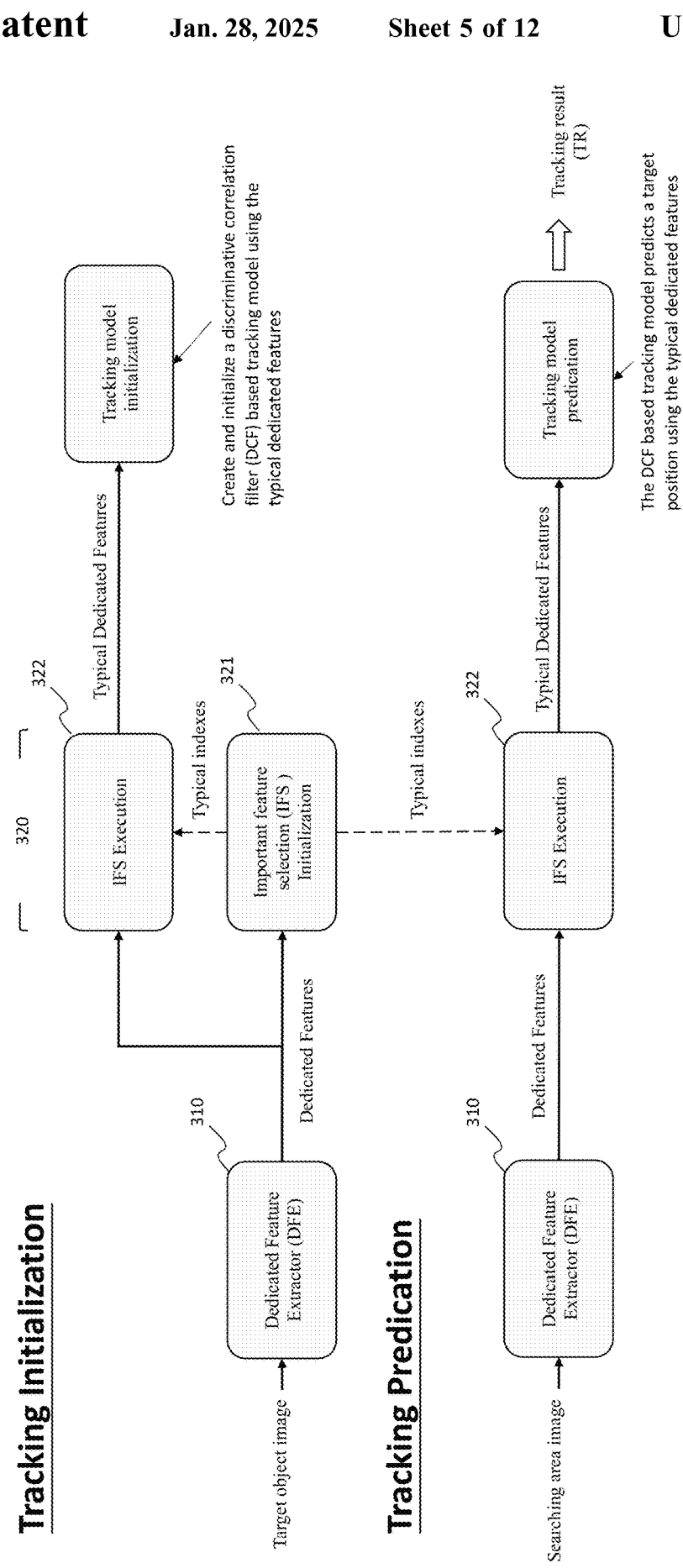
FIG. 3C depicts a schematic diagram of tracking initialization and tracking predication performed by tracking model.

Furthermore, referring to FIGS. 3B and 3C, the tracking model includes a Dedicated Feature Extractor (DFE) 310 and an Important Features Selection (IFS) 320. The DFE is constructed by the first three convolutional blocks of the M convolutional blocks. The DFE extracts multi-resolution high-dimensional features (e.g., dedicated features) from the input image data (e.g., image frame) to output to the IFS 320. By utilizing the strong representation capability of DFE, IFS can directly select N % high activated features using the spatial averaging as the most useful features (e.g., typical dedicated features). N can be, for example, 10 or other value, the invention is not limited hereto. The DFE 310 works together with IFS 320 to improve tracking speed and reduce processing delay to guarantee real-time processing.

In more details, as illustrated by the upper portion (Tracking Initialization) of FIG. 3C, when a new detection result is generated by the detecting model, the processor 110 will create and initialize a new tracking model. The target object image corresponding to the qualified detection result (when its score is higher than threshold Th) is inputted into the DFE 310 (part of the CNN) to obtain the corresponding dedicated features. The dedicated features are inputted to the IFS initialization 321 to obtain typical indexes and the typical indexes are recorded. The processor 110 then selects typical dedicated features from the dedicated features DF according to the recorded typical indexes in the tracking prediction. The typical dedicated features are then used to create and initialize a discriminative correlation filter (DCF) based tracking model. The target object detected by the detecting model is then tracked by the created DCF based tracking model. Since the tracking model learns the correlation filters from features of the target appearance to discriminate between the target and background appearance, it is referred to as the discriminative correlation filter (DCF) based tracking model.

In more details, during the tracking initialization, a DCF based tracking model is created and initialized, comprising: inputting the typical dedicated features of the target object image; transforming the typical dedicated features to frequency domain using Fast Fourier Transform (FFT); generating the transformed typical dedicated features; and training the correlation filters to discriminate between the target and background appearance using the transformed typical dedicated features in frequency domain.

After a tracking model is created and initialized (after tracking initialization), the processor 110 will continuously perform the tracking predication with this tracking model for the following video frames until the tracking model is removed. As illustrated by the lower portion (Tracking Prediction) of FIG. 3C, a searching area image is inputted to the DFE 310. The processor 110 determine a part of the image frame surrounding the target position of the tracking result in previous frame as searching area image. The DFE 310 may then generate dedicated features from the searching area image. The IFS execution 322 reads the recorded typical indexes to obtain the typical dedicated features among the dedicated features. Finally, the initialized DCF based tracking model uses the typical dedicated features to predict the target position of the target object as tracking result TR.

The IFS process is explained in details below with FIG. 3D.

Figure 3D:
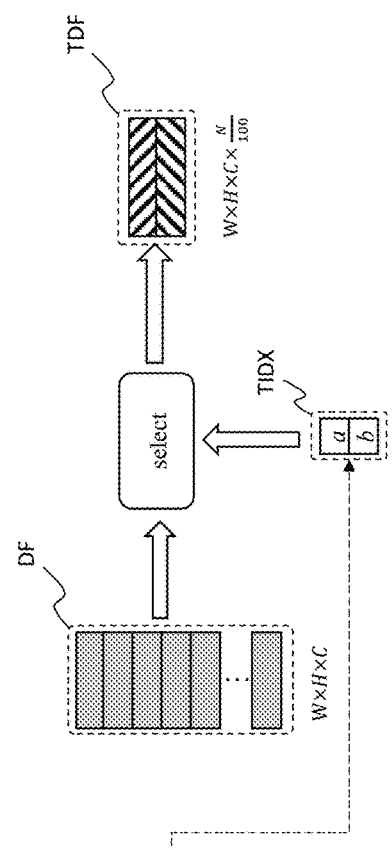
FIG. 3D depicts a schematic diagram of important feature selection (IFS) initialization and IFS execution.
Figure 3D:
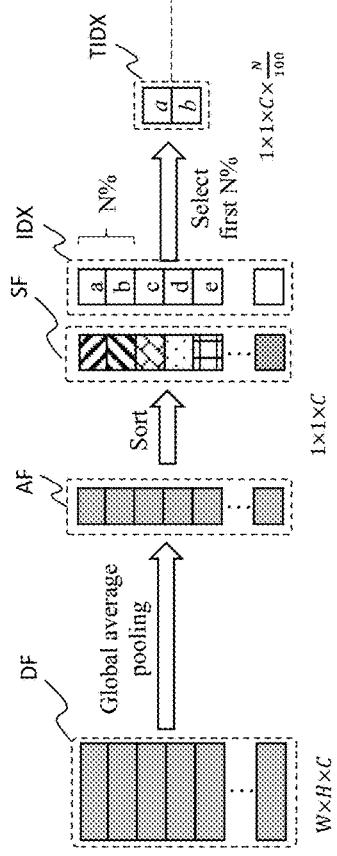

Referring to FIG. 3D, during the IFS initialization, after inputting a target object image corresponding to the detection result to the part of the CNN to obtain dedicated features DF, the processor 110 performs global average pooling on the dedicated features DF to obtain average features AF. Then, the processor 100 sorts the average features AF in descending order to obtain sorted features SF and an array of indexes (IDX) of the sorted features SF. Next, the processor 110 selects the first N % of the array of indexes of the sorted features as typical indexes TIDX, wherein the typical indexes TIDX are recorded. In other words, The IFS helps to select the most top N % important features to reduce the dimension of the dedicated features and hence reduce the computation of tracking predication, such that the time and cost for tracking object is reduced and the efficiency therein is improved.

For example, suppose the average features are [3,6,4,1] and their indexes are [0,1,2,3]. In this example, the sorted features are [6,4,3,1] and an array of indexes of the sorted features are [1,2,0,3]. If the first two (e.g., N=50) are selected, then the typical indexes are [1,2].

Furthermore, during the IFS execution, the processor 110 inputs a searching area of the image frame to the part of the CNN to obtain dedicated features DF. The position of the searching area is, for example, determined according to the tracking result of a previous image frame. The processor 110 accesses the recorded typical indexes, and selects typical dedicated features TDF from the dedicated features DF according to the recorded typical indexes IDX. In other words, the typical indexes are recorded during the IFS Initialization and used during the IFS execution.

Referring again to FIG. 3A, in step S330 the processor 110 selects zero or more target detection results having first detection scores higher than a first detection threshold ($T_l$) from the detection results. In detail, the processor 110 determines whether a first detection score of a detection result is higher than a first detection threshold ($T_l$). If the first detection score of a detection result is higher than the first detection threshold, the processor 110 performs a detection score enhancement (DSE) operation according to the detection result and the tracking results to obtain an enhanced detection result (step S350).

Artifacts are very common in the endoscopic videos (low-quality frames) such as over- and under-exposure, motion blur, video defocus, fluid, bubbles, specular reflections, and floating objects. As the detecting model is trained on qualified training images, directly applying it to these low-quality frames will produce low confidence detections (Detecting model may find the target object but with very low detection score). The aim of DSE is to utilize the tracking result to assist to enhance low confidence detections to compensate the image quality defect by using temporal information, which will improve the accuracy of detection result.

Specifically, given a detection result d, a tracking model t is found whose tracking result has largest overlapping (measured by intersection over union (IoU)) with d, and q is last associated detection result of tracking model t. The score $\bar{Y}^{(d)}$ of the enhanced detection result can be presented by the formula (1) below.

$$\bar{Y}^{(d)} = \max\left(Y^{(d)}, \frac{Y^{(d)} + \lambda L Y^{(q)}}{1 + \lambda L}\right), L = \frac{M^{(t)}}{1 + \beta U^{(t)}} \quad (1)$$

where $Y^{(d)}$ is the score of detection result d, $Y^{(q)}$ is the score of the last associated detection result of tracking model t from processed frames, $M^{(t)}$ (matched count) is the number of successive frames with a matched detection result associated with the tracking model t, $U^{(t)}$ (unmatched count) is the number of successive frames without a matched detection result associated with tracking model t, $\lambda$ is a confidence parameter for long-term detection, $\beta$ is an uncertainty parameter for successive occurrence of unmatching ($\lambda$=2, $\beta$=1.5 by default).

Figure 4:
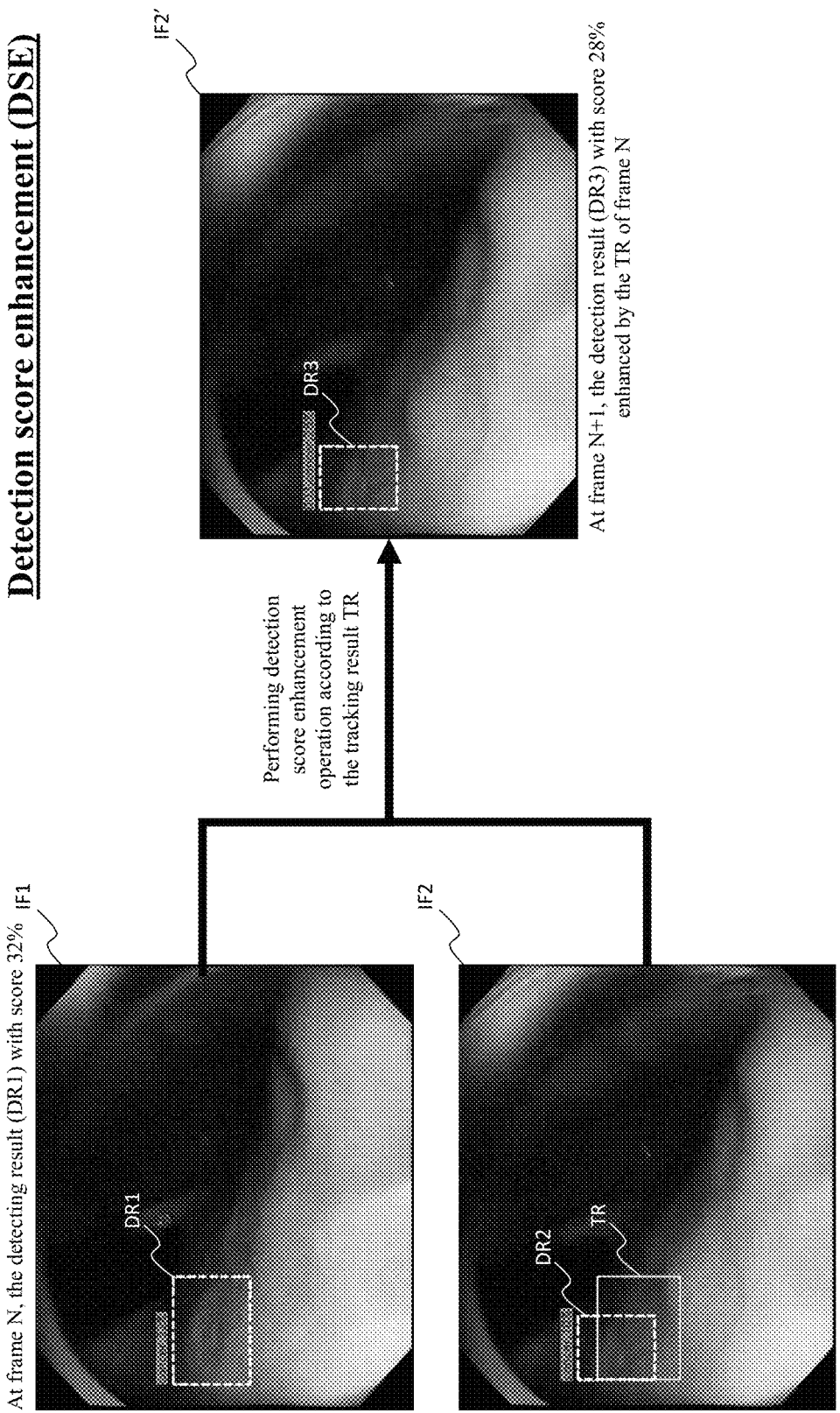
FIG. 4 depicts a schematic diagram of detection score enhancement (DSE)

Referring to FIG. 4, for example, assuming that the image frame IF1 is inputted to the detecting model, the detection result DR1 with detection score 32% is generated. The detection result is associated with a tracking model. Next, an image frame IF2 after the image frame IF1 is inputted to the detecting model and the tracking model, so as to obtain a detection result DR2 with detection score 10% and a tracking result TR. The processor 110 performs the detection score enhancement operation according to the formula (1), so as to obtain the enhanced detection result DR3 for the image frame IF2', the enhanced detection result DR3 has an enhanced detection score 28% higher than the original detection score 10%. It should be noted that "003, cancer, 28%" is the tag displayed according to the tag information of the enhanced detection result DR3. "003" is the ID of the target object, and "cancer" is the target object's type.

Referring again to FIG. 3A, in step S360 the processor 110 determines whether a second detection score of an enhanced detection result is higher than a second detection threshold ($T_m$). The processor 110 selects the enhanced detection results with score higher than the second detection threshold to perform step S370.

Furthermore, in step S320, the processor 110 inputs the image data into zero or more tracking models to generate zero or more tracking results. Each tracking result has its own tracking model. The step of inputting the image data into the zero or more tracking models to generate the zero or more tracking results includes: inputting a searching area of the image frame to the part of the CNN to obtain second dedicated features; accessing the recorded typical indexes; selecting typical dedicated features from the second dedicated features according to the recorded typical indexes; inputting the typical dedicated features to each of the tracking models to predict the target position and output the response score (i.e., tracking score), wherein the tracking model is a DCF based tracking model; and determining the track mark positions according to the predicted target positions; and generating the tracking results according to the track mark positions, wherein each of the tracking results includes a corresponding track mark position and a corresponding tracking score. The typical dedicated features are fed into the discriminative correlation filter (DCF) based tracking model, and the tracking model outputs the predicted target position and its response score (i.e., tracking score).

In more details, the tracking predication comprising: inputting the typical dedicated features of search area image; transforming the typical dedicated features to frequency domain using Fast Fourier Transform (FFT); generating transformed typical dedicated features; computing the Fourier response maps using element-wise multiplication between the trained correlation filters and the transformed typical dedicated features in frequency domain; summing the Fourier response maps of typical dedicated features to generate a summarized Fourier response map; transforming, by applying Inverse FFT, the summarized Fourier response map to spatial domain to generate a spatial response map; identifying the location with maximum response value from the spatial response map; and outputting the identified location as new target position and the maximum response value as tracking score.

Next, in step S340, the processor 110 selects zero or more target tracking results having first tracking scores higher than a first tracking threshold ($T_{corr}$) from the tracking results. In detail, the processor 110 determines whether a first tracking score of a tracking result is higher than a first tracking threshold ($T_{corr}$). The processor 110 selects tracking results having score higher than the first tracking threshold to perform step S370.

In step S370, the processor 110 performs a matching operation on the target enhanced detection results and the target tracking results to generate matching outcomes. The matching outcomes includes zero or more matched results and zero or more unmatched target detection results and zero or more unmatched target tracking results, wherein each of the matched results has a pair of matched target enhanced detection result and target tracking result, wherein the target object in the displayed image frame is marked according to the generated matching outcomes (e.g., steps S380 and S390). For example, assuming that there are X target enhanced detection results and Y target tracking results, and the matching operation will generate Z matched results, X-Z unmatched target detection results and Y-Z unmatched target tracking results.

The matching operation uses the Hungarian Algorithm. Specifically, the target enhanced detection results and target tracking results are matched using Hungarian Algorithm, in which intersection over union (IoU) between each detected box (detection result) and tracked box (tracking result) are computed as assignment cost. IoU threshold 0.2 is used to filter out the matched pair with low overlapping.

In step S380, the processor 110 processes the matched results. In step S390, the processor 110 processes unmatched target detection results and unmatched target tracking results.

Figure 5A:
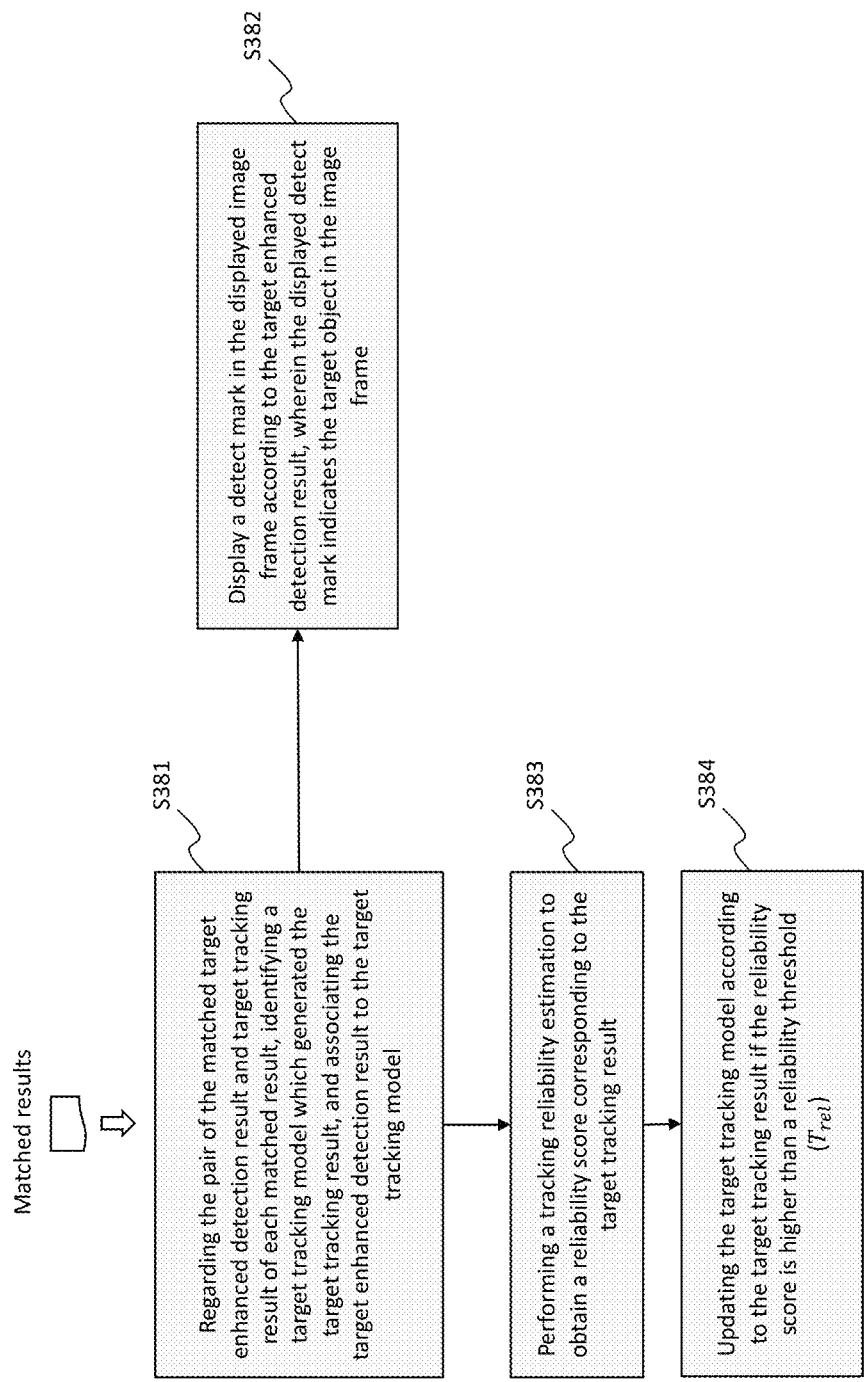
FIG. 5A depicts a flowchart of step S380 of FIG. 3A.

Referring to FIG. 5A, in step S381, regarding the pair of the matched target enhanced detection result and target tracking result of each matched result, the processor 110 identifies a target tracking model which generated the target tracking result, and associates the target enhanced detection result to the target tracking model. Next, in step S382, the processor 110 instructs the I/O circuit 150 to display a detect mark (e.g., DR1 in FIG. 4) in the displayed image frame according to the target enhanced detection result, wherein the displayed detect mark indicates the target object in the image frame, wherein the target enhanced detection result comprises a detect mark position and tag information corresponding to the target object.

Furthermore, in step S383, the processor 110 performing a tracking reliability estimation to obtain a reliability score corresponding to the target tracking result.

Given a tracking model t, which generated the tracking result its tracking reliability is estimated by the last associated detection result q of the tracking model t, as presented by formula (2) below.

$$R^{(t)} = \frac{Z^{(t)} * Y^{(q)}}{1 + \alpha U^{(t)}} \qquad (2)$$

Where $Z^{(t)}$ is the score of the tracking result, and also the current tracking score of the tracking model t, $Y^{(q)}$ is the detection score of its last associated detection result q, $U^{(t)}$ (unmatched count) is number of successive frames without matched detection result associated to tracking model t, $\alpha$ is an uncertainty parameter for successive occurrence of unmatching ($\alpha=0.1$ by default).

The detection score indicates the identity of the target object, the tracking score is the correlation response of the tracked target object with the detection results in previous frames, their multiplication will describe the identity of the tracked target object, which reflects the reliability of the current tracking result.

Regarding a tracking model and its tracking result, the tracking reliability estimation (TRE) will help: if matched detection result is found, the tracking model will be updated when the corresponding TRE score (also called as reliability score) is higher than given threshold; else if no matched detection result is found, the tracked object will be generated when the TRE is higher than given threshold.

Selectively updating the tracking model with high TRE can remove any unreliable samples to avoid tracking drifting and hence improve the robustness of tracking. Selectively generating the tracking results with high TRE for some target object missed by the detecting model can create more stable tracking to improve the monitoring visualization.

The step of updating the tracking model (tracker) includes: (a) inputting the target object image corresponding to the tracking result to the part of the CNN to obtain dedicated features DF; (b) inputting dedicated features DF to IFS execution to obtain the typical dedicated features TDF; (c) adding the typical dedicated features TDF as a new training sample; and (d) training the tracking model using all training samples when there are more than K new added samples (K=10) and resetting the counter of new samples after training.

Next, in step S384, the processor 110 updates the target tracking model according to the target tracking result if the reliability score is higher than a reliability threshold ($T_{rel}$). Otherwise, the processor 110 will not update the tracking model which generates the target tracking result if the reliability score is not higher than a reliability threshold ($T_{rel}$).

In addition, some control parameters will be updated when an enhanced detection result is associated with a tracking model t. For example, (1) if $U^{(t)}>0$: $U^{(t)}=0$, $M^{(t)}=0$; (2) $M^{(t)}+=1$.

Figure 5B:
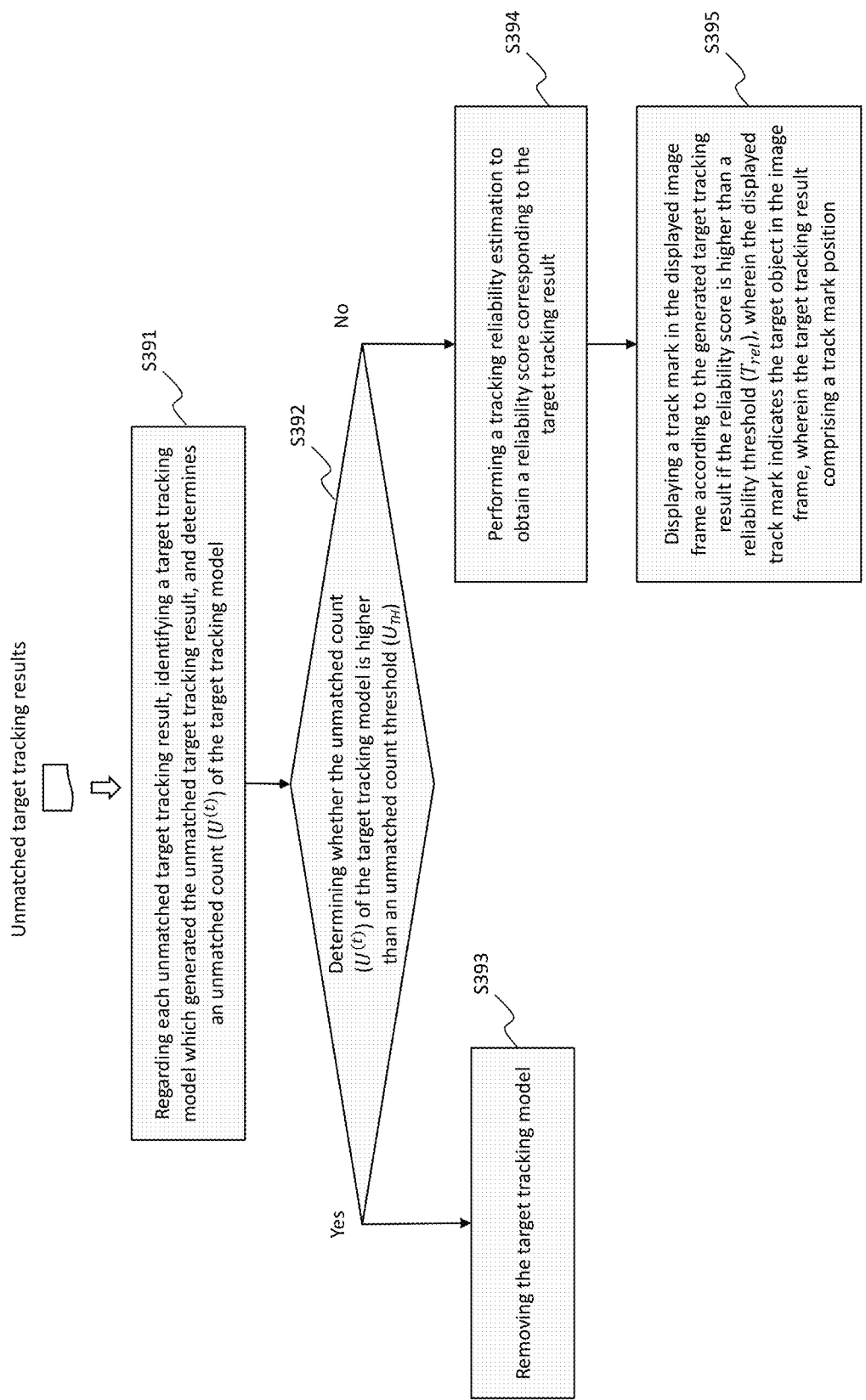
FIG. 5B depicts a flowchart of step S390 of FIG. 3A.

Referring to FIG. 5B (processing the unmatched tracking results), in step S391, regarding each unmatched target tracking result, the processor 110 identifies a target tracking model which generated the unmatched target tracking result, and determines an unmatched count ($U^{(t)}$) of the target tracking model. Some control parameters will be updated, for example $U^{(t)}+=1$, wherein t is the tracking model.

Next, in step S392, the processor 110 determining whether the unmatched count ($U^{(t)}$) of the target tracking model is higher than an unmatched count threshold ($U_{TH}$).

If the unmatched count ($U^{(t)}$) is higher than an unmatched count threshold, in step S393, the processor 110 removes the target tracking model. If the unmatched count ($U^{(t)}$) is not higher than an unmatched count threshold, in step S394, the processor 110 performs a tracking reliability estimation to obtain a reliability score corresponding to the target tracking result.

Next, in step S395, the processor 110 instructs the I/O circuit 150 to display a track mark in the displayed image frame according to the generated target tracking result if the reliability score is higher than a reliability threshold ($T_{rel}$), wherein the displayed track mark indicates the target object in the image frame, wherein the target tracking result comprising a track mark position. If the reliability score is not higher than a reliability threshold ($T_{rel}$), the processor 110 disregards this target tracking result.

Figure 5C:
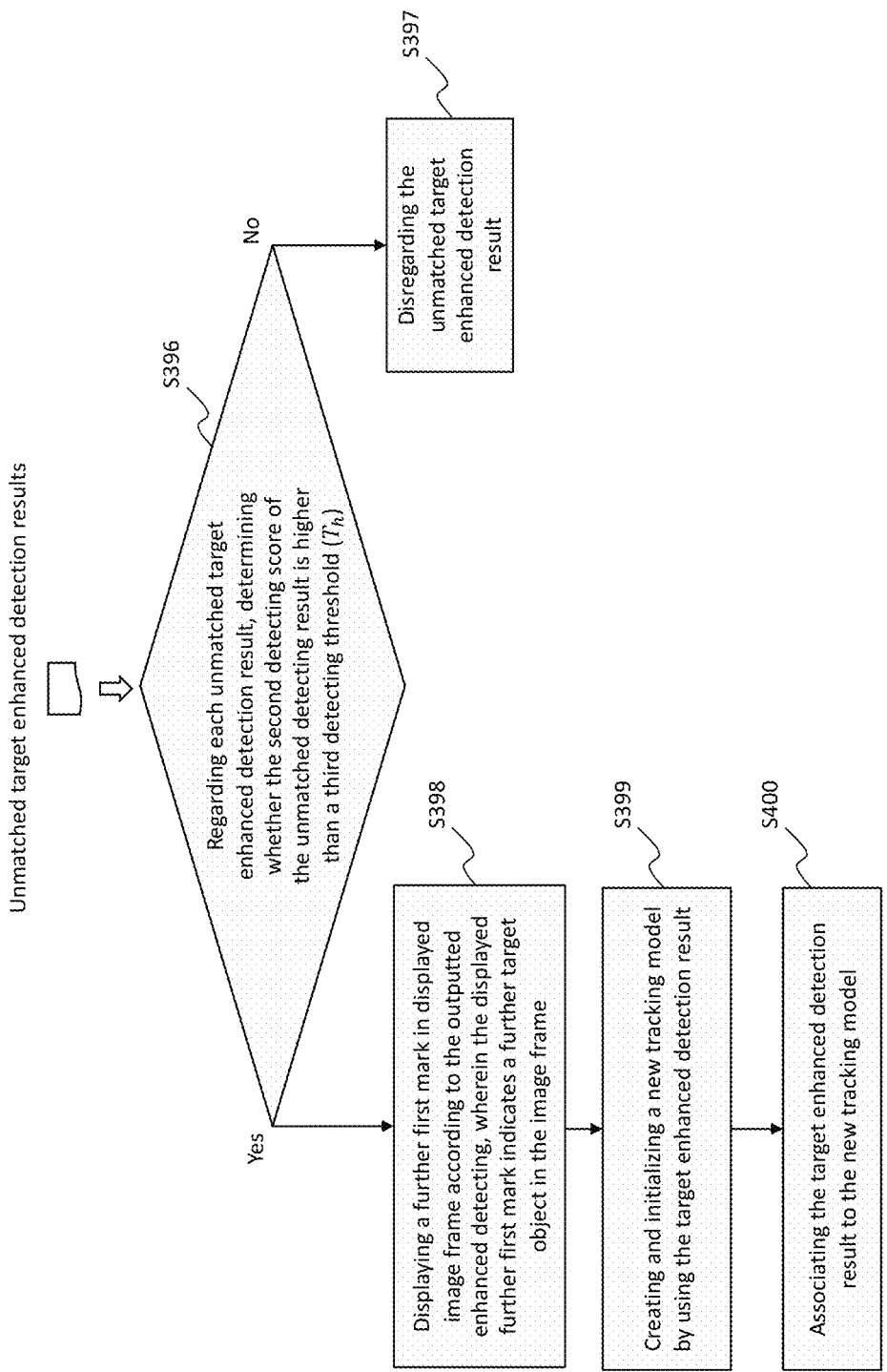
FIG. 5C depicts a further flowchart of step S390 of FIG. 3A.

In another aspect, referring to FIG. 5C (processing the unmatched detection results), in step S396, regarding each unmatched target enhanced detection result, the processor 110 determines whether the second detection score of the target enhanced detection result is higher than a third detection threshold ($T_h$). If the second detection score is not higher than the third detection threshold ($T_h$), in step S397, the processor 110 disregards the unmatched target enhanced detection result; else if the second detection score is higher than the third detection threshold ($T_h$), continue to step S398, the processor instructs the I/O circuit 150 to display a further detect mark in the displayed image frame according to the target enhanced detection result, wherein the displayed further detect mark indicates a further target object in the image frame, wherein the enhanced detection result comprises a further detect mark position and further tag information corresponding to the further target object.

Next, in step S399, the processor 110 creates and initializes a new tracking model by using the target enhanced detection result if the second detection score of the target enhanced detection result is higher than a third detection threshold ($T_h$). The step of creating and initializing the new tracking model by using the target detection result includes: inputting target object image corresponding to the target detection result to the part of the CNN to obtain first dedicated features; performing a global average pooling on the first dedicated features to obtain average features AF; sorting the average features in descending order to obtain sorted features SF and obtain an array of indexes IDX of the sorted features; selecting first top N % of the array of indexes as typical indexes TIDX, wherein the typical indexes are recorded; selecting typical dedicated features TDF from the first dedicated features according to the recorded typical indexes; and creating and initializing a discriminative correlation filter (DCF) based tracking model by using the typical dedicated features.

Next, in step S400, the processor 110 associates the target enhanced detection result to the new tracking model. This is the association between the new tracking model and the detection result established first time. In addition, some control parameters will be updated when the association established first time. For example, $U^{(t)}=0$, $M^{(t)}=1$, wherein t is the tracking model.

Figure 6:
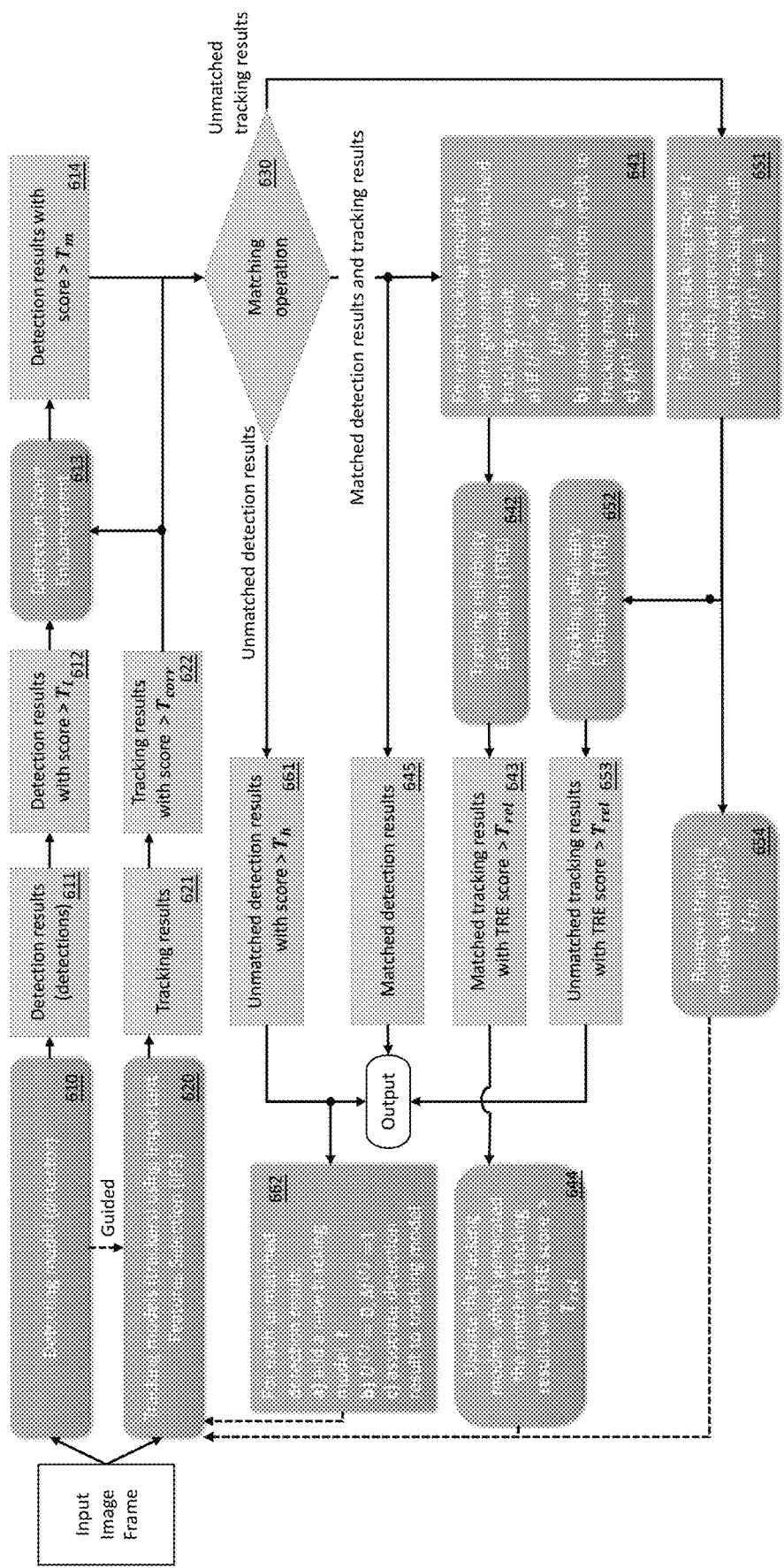
FIG. 6 depicts a schematic diagram of operation flow of the provided method.

Referring to FIG. 6, the image frame is inputted into detecting model (610) to obtain detection results (611), and into the tracking models (620) to obtain the tracking results (621). The score of each detection result will be determined and be compared with threshold $T_l$ (612). The score of each tracking result will be determined and be compared with threshold $T_{corr}$ (622). When the detection score is higher than the threshold $T_l$, the detection score enhancement is performed (613). The score of each enhanced detection result will be determined and be compared with threshold $T_m$, (614). The enhanced detection results with score higher than the threshold $T_m$ is matched with the tracking results with score higher than the threshold $T_{corr}$ by performing a matching operation using Hungarian Algorithm (630), in which intersection over union (IoU) between each detected box (detect mark) and tracked box (track mark) are computed as assignment cost. $T_l$: low score threshold to retrieve all the potential detection results. $T_m$: score threshold to retrieve the candidate detection results to associate with tracking results. $T_{corr}$: threshold to filter the tracking results having very low correlation response.

For each matched detection result and tracking result, control parameters of the tracking mode which generated the tracking result are updated, and the enhanced detection result is associated to the tracking model (641). Then, the tracking reliability estimation (TRE) is performed to obtain the TRE score (642), and the TRE score is compared with the threshold $T_{rel}$ (643). When the TRE score is higher than the threshold $T_{rel}$, the tracking model which generated the tracking result will be updated (644). Furthermore, all matched detection results will be generated (645). $T_{rel}$: threshold to select the tracking models with high tracking reliability.

For unmatched tracking result, corresponding control parameter (e.g., unmatched count $U^{(t)}$ is updated (651). Then, the tracking reliability estimation (TRE) is performed to obtain the TRE score (652), and the TRE score is compared with the threshold $T_{rel}$. When the TRE score is higher than the threshold $T_{rel}$, the tracking result will be generated (653). It should be noted that the tracking model will be removed/disabled when the unmatched count is higher than threshold $U_{TH}$ (654).

The unmatched detection results with score higher than the threshold $T_h$ is generated (661). For each generated unmatched detection result, a new tracking model will be added, control parameters of the new created tracking model is updated, and the unmatched detection result is associated with the new created tracking model (662). $T_h$: high score threshold to retrieve the high confidence detection results.

Figure 7:
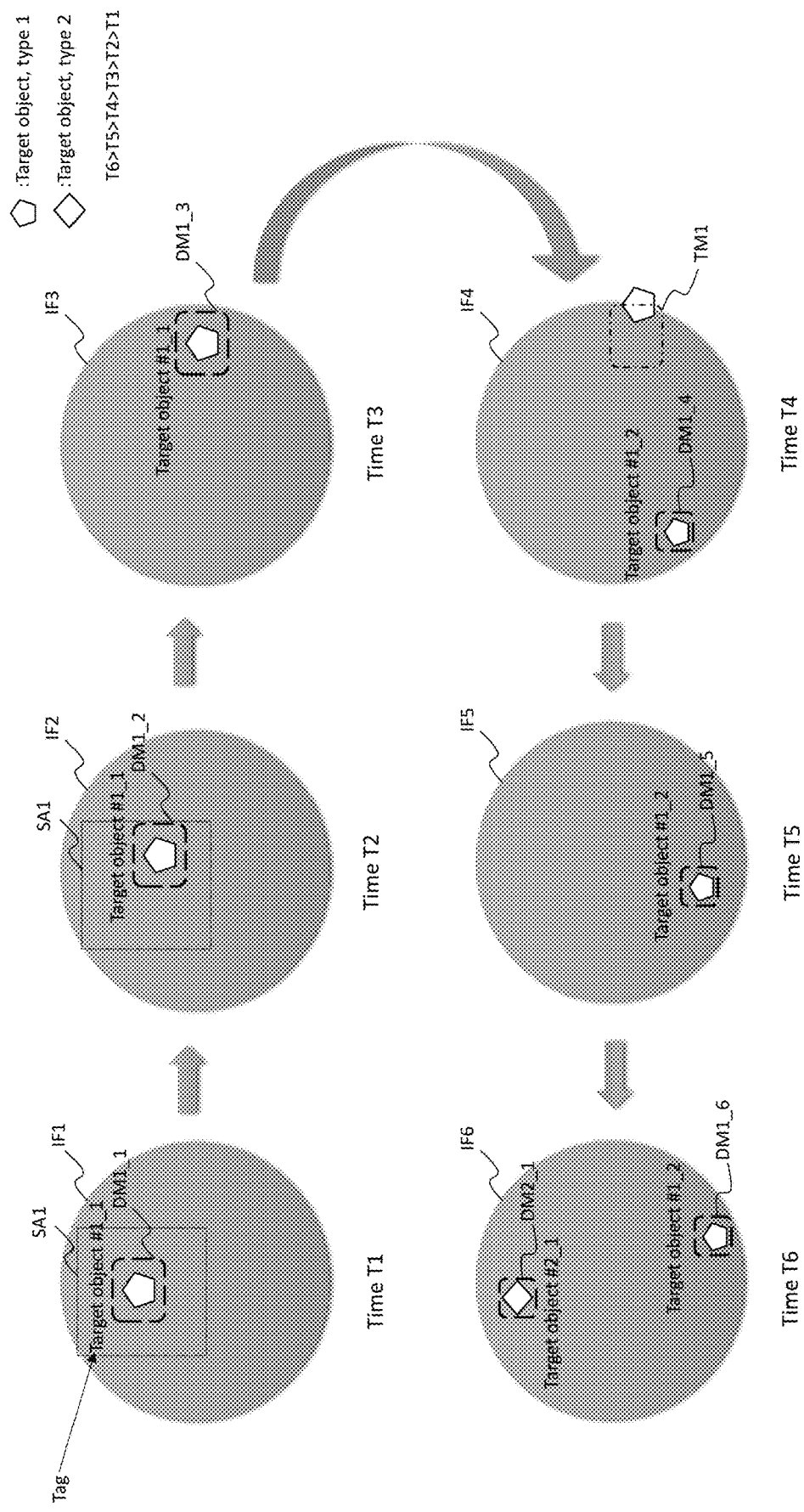
FIG. 7 depicts an example of detecting and tracking operations on target objects.

Referring to FIG. 7, for example, at time T1 the image frame IF1 is inputted to the detecting model to obtain a detection result. Assuming that the detection result score is higher than threshold $T_h$, a tracking model is created using the detection result. The searching area SA1 is determined according to the detection result. The searching area SA1 will be used for the tracking model to track the target object in next image frame (e.g., at time T2). The detect mark DM1_1 is displayed. Also, the corresponding tag "Target object #1_1" is displayed near the detect mark according to the tag information of the detection result.

At time T2, the image frame IF2 is inputted to the detecting model to obtain a further detection result. The searching area SA1 of the image frame IF2 is inputted to the created tracking model to obtain the tracking result. Assuming that the further detection result and the tracking result are matched, the detect mark DM1_2 is displayed. Also, the corresponding tag "Target object #1_1" is displayed near the detect mark according to the tag information of the detection result. A further searching area SA2 will be determined according to the current tracking result, and the searching area SA2 will be used for tracking model to track object in next image frame (e.g., at time T3).

At time T3, the image frame IF3 is inputted to the detecting model to obtain a further detection result. Assuming that the further detection result and the tracking result are matched, the detect mark DM1_3 is displayed. Also, the corresponding tag "Target object #1_1" is displayed near the detect mark according to the tag information of the detection result.

At time T4, the image frame IF4 is inputted to the detecting model to obtain a further detection result. Assuming that the further detection result and the tracking result are not matched, and the TRE score of the unmatched tracking result is higher than the $T_{rel}$, the track mark TM1 is displayed. Assuming that the unmatched detection result score is higher than threshold $T_h$, a new tracking model is created using the unmatched detection result. Therefore, there are two tracking models. The detect mark DM1_4 is displayed. Also, the corresponding tag "Target object #1_2" is displayed near the detect mark according to the tag information of the detection result.

At time T5, the image frame IFS is inputted to the detecting model to obtain a further detection result and inputted to the two tracking models to obtain two tracking results. Assuming that the further detection result and one of tracking results are matched, the detect mark DM1_5 is displayed. Also, the corresponding tag "Target object #1_2" is displayed near the detect mark according to the tag information of the detection result. Regarding another unmatched tracking result, assuming that the unmatched count of the tracking model which generated this tracking result is higher than the threshold $U_{TH}$, the tracking model is removed. Therefore, there are only one tracking model left.

At time T6, the image frame IF6 is inputted to the detecting model to obtain further detection results. Assuming that one of the further detection results is matched with the tracking result, the corresponding detect mark DM1_6 is displayed, and the corresponding tag "Target object #1_2" is displayed. Furthermore, assuming that the score of another unmatched detection result is higher than threshold $T_h$, a new tracking model is created using the unmatched detection result. The detect mark DM2_1 is displayed. Also, the corresponding tag "Target object #2_1" is displayed.

The above exemplary embodiment and operations serve only as illustration of the present invention, and an ordinarily skilled person in the art will appreciate that other structural and functional configurations and applications are possible and readily adoptable without undue experimentation and deviation from the spirit of the present invention.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for detecting and tracking target object in a captured video using a single convolutional neural network (CNN) by a video monitoring device, comprising:
   generating, by a processor of the video monitoring device, image data according to an image frame of the captured video;
   inputting, by the processor, the image data into a detecting model to generate one or more detection results, wherein the detecting model is constructed by the single CNN;

inputting, by the processor, the image data into one or more tracking models to generate one or more tracking results, wherein the tracking models use a part of the single CNN;

generating, by the processor, target detection results by selecting the detection results having first detection scores higher than a first detection threshold ($T_l$);

generating, by the processor, target tracking results by selecting the tracking results having first tracking scores higher than a first tracking threshold ($T_{corr}$);

performing, by the processor, a detection score enhancement operation to generate enhanced detection results according to the target detection results and the tracking results;

generating, by the processor, target enhanced detection results by selecting the enhanced detection results having second detection scores higher than a second detection threshold ($T_m$);

performing, by the processor, a matching operation on the target enhanced detection results and the target tracking results to generate matching outcomes;

wherein the matching outcomes comprises one or more of matched results, unmatched target detection results, and unmatched target tracking results;

wherein each of the matched results has a pair of matched target enhanced detection result and target tracking result; and wherein the target object in the displayed image frame is marked according to the generated matching outcomes.

2. The computer-implemented method of claim 1, further comprising processing matched results (S380), wherein the step of processing the matched results comprises:

regarding the pair of the matched target enhanced detection result and target tracking result of each matched result, identifying a target tracking model from the one or more tracking models that generated the target tracking result;

associating the target enhanced detection result to the target tracking model;

performing a tracking reliability estimation to obtain a reliability score corresponding to the target tracking result;

updating the target tracking model according to the target tracking result if the reliability score is higher than a reliability threshold ($T_{rel}$); and displaying a detect mark in the displayed image frame according to the target enhanced detection result, wherein the displayed detect mark indicates the target object in the image frame, wherein the target enhanced detection result comprises a detect mark position and tag information corresponding to the target object.

3. The computer-implemented method of claim 1, further comprising processing unmatched target detection results, wherein the step of processing the unmatched target detection results comprises:

for each of the unmatched target enhanced detection results:

determining whether the second detection score of the target enhanced detection result is higher than a third detection threshold ($T_h$);

if the second detection score of the target enhanced detection result is not higher than the third detection threshold ($T_h$), disregarding the unmatched target enhanced detection result;

if the second detection score of the target enhanced detection result is higher than the third detection threshold ($T_h$), displaying a further detect mark in the displayed image frame according to the target enhanced detection result;

wherein the displayed further detect mark indicates a further target object in the image frame; and wherein the enhanced detection result comprises a further detect mark position and further tag information corresponding to the further target object;

creating and initializing a new tracking model by using the target enhanced detection result; and associating the target enhanced detection result to the new tracking model.

4. The computer-implemented method of claim 3, further comprising processing unmatched target tracking results, wherein the step of processing the unmatched target tracking results comprises:

for each of the unmatched target tracking results:

identifying a target tracking model which generated the unmatched target tracking result;

determining an unmatched count of the target tracking model;

determining whether the unmatched count ($U^{(t)}$) of the target tracking model is higher than an unmatched count threshold ($U_{TH}$);

if the unmatched count of the target tracking model is higher than the unmatched count threshold, removing the target tracking model; and if the unmatched count of the target tracking model is not higher than the unmatched count threshold, performing a tracking reliability estimation to obtain a reliability score corresponding to the target tracking result; and displaying a track mark in the displayed image frame according to the generated target tracking result if the reliability score is higher than a reliability threshold ($T_{rel}$);

wherein the displayed track mark indicates the target object in the image frame; and wherein the target tracking result comprising a track mark position.

5. The computer-implemented method of claim 3, wherein the step of creating and initializing the new tracking model by using the target detection result comprises:

inputting target object image corresponding to the target detection result to the part of the single CNN to obtain first dedicated features;

performing a global average pooling on the first dedicated features to obtain average features (AF);

sorting the average features in descending order to obtain sorted features (SF) and obtain an array of indexes (IDX) of the sorted features;

selecting first top N % of the array of indexes as typical indexes (TIDX), wherein the typical indexes are recorded;

selecting typical dedicated features (TDF) from the first dedicated features according to the recorded typical indexes; and creating and initializing a discriminative correlation filter (DCF) based tracking model by using the typical dedicated features.

6. The computer-implemented method of claim 5, wherein the step of inputting the image data into the tracking models to generate the tracking results comprises:

for each of the tracking models:

inputting a searching area of the image frame to the part of the single CNN to obtain second dedicated features;
accessing the recorded typical indexes;
selecting typical dedicated features from the second dedicated features according to the recorded typical indexes;
inputting the typical dedicated features to the tracking model to predict the target position in the image frame, wherein the tracking model is a DCF based tracking model; and
determining the track mark position according to the predicted target position; and
generating the tracking result according to the track mark position, wherein the tracking result includes a corresponding track mark position.

7. The computer-implemented method of claim 1, wherein the step of inputting the image data into the detecting model to generate the detection results comprises:
inputting the image data to the single CNN to obtain features of the image frame;
determining, according to the features, one or more detect mark positions, detection scores, and one or more target objects' types;
generating the detection results according to the detect mark positions and the target objects' types;
wherein each of the detection result includes a corresponding detect mark position and corresponding tag information; and
wherein the tag information includes the target object's type of the corresponding detection result.

8. A video monitoring device for detecting and tracking target object in a captured video using a single convolutional neural network (CNN), comprising:
a camera, configured to capture video; and
a processor, configured to execute machine instructions to implement a method to detect and track the target object, and the method comprises:
generating, by a processor of the video monitoring device, image data according to an image frame of the captured video;
inputting, by the processor, the image data into a detecting model to generate one or more detection results, wherein the detecting model is constructed by the single CNN;
inputting, by the processor, the image data into one or more tracking models to generate one or more tracking results, wherein the tracking models use a part of the single CNN;
generating, by the processor, target detection results by selecting the detection results having first detection scores higher than a first detection threshold ($T_l$);
generating, by the processor, target tracking results by selecting the tracking results having first tracking scores higher than a first tracking threshold ($T_{corr}$);
performing, by the processor, a detection score enhancement operation to generate enhanced detection results according to the target detection results and the tracking results;
generating, by the processor, target enhanced detection results by selecting the enhanced detection results having second detection scores higher than a second detection threshold ($T_m$);
performing, by the processor, a matching operation on the target enhanced detection results and the target tracking results to generate matching outcomes;
wherein the matching outcomes comprises one or more of matched results, unmatched target detection results, and zero or more unmatched target tracking results;
wherein each of the matched results has a pair of matched target enhanced detection result and target tracking result; and
wherein the target object in the displayed image frame is marked according to the generated matching outcomes.

9. The video monitoring device of claim 8, wherein the method further comprises processing matched results (S380), wherein the step of processing the matched results comprises:
regarding the pair of the matched target enhanced detection result and target tracking result of each matched result,
identifying a target tracking model from the one or more tracking models that generated the target tracking result;
associating the target enhanced detection result to the target tracking model;
performing a tracking reliability estimation to obtain a reliability score corresponding to the target tracking result;
updating the target tracking model according to the target tracking result if the reliability score is higher than a reliability threshold ($T_{rel}$); and
displaying a detect mark in the displayed image frame according to the target enhanced detection result, wherein the displayed detect mark indicates the target object in the image frame, wherein the target enhanced detection result comprises a detect mark position and tag information corresponding to the target object.

10. The video monitoring device of claim 8, wherein the method further comprises processing unmatched target detection results, the step of processing the unmatched target detection results comprises:
for each of the unmatched target enhanced detection results:
determining whether the second detection score of the target enhanced detection result is higher than a third detection threshold ($T_h$);
if the second detection score of the target enhanced detection result is not higher than the third detection threshold ($T_h$), ignoring the unmatched target enhanced detection result;
if the second detection score of the target enhanced detection result is higher than the third detection threshold ($T_h$), displaying a further detect mark in the displayed image frame according to the target enhanced detection result;
wherein the displayed further detect mark indicates a further target object in the image frame; and
wherein the enhanced detection result comprises a further detect mark position and further tag information corresponding to the further target object;
creating and initializing a new tracking model by using the target enhanced detection result; and
associating the target enhanced detection result to the new tracking model.

11. The video monitoring device of claim 10, wherein the method further comprises processing unmatched target tracking results, the step of processing the unmatched target tracking results comprises:

regarding each unmatched target tracking result,
identifying a target tracking model which generated the unmatched target tracking result;
determining an unmatched count of the target tracking model;
determining whether the unmatched count ($U^{(t)}$) of the target tracking model is higher than an unmatched count threshold ($U_{TH}$);
if the unmatched count of the target tracking model is higher than the unmatched count threshold, removing the target tracking model; and
if the unmatched count of the target tracking model is not higher than the unmatched count threshold,
performing a tracking reliability estimation to obtain a reliability score corresponding to the target tracking result; and
displaying a track mark in the displayed image frame according to the generated target tracking result if the reliability score is higher than a reliability threshold ($T_{rel}$);
wherein the displayed track mark indicates the target object in the image frame; and
wherein the target tracking result comprising a track mark position.

12. The video monitoring device of claim 10, wherein the step of creating and initializing the new tracking model by using the target detection result comprises:
inputting target object image corresponding to the target detection result to the part of the single CNN to obtain first dedicated features;
performing a global average pooling on the first dedicated features to obtain average features (AF);
sorting the average features in descending order to obtain sorted features (SF) and obtain an array of indexes (IDX) of the sorted features;
selecting first top N % of the array of indexes as typical indexes (TIDX), wherein the typical indexes are recorded;
selecting typical dedicated features (TDF) from the first dedicated features according to the recorded typical indexes; and
creating and initializing a discriminative correlation filter (DCF) based tracking model by using the typical dedicated features.

13. The video monitoring device of claim 12, wherein the step of inputting the image data into the tracking models to generate the tracking results comprises:
for each of the tracking models:
inputting a searching area of the image frame to the part of the single CNN to obtain second dedicated features;
accessing the recorded typical indexes;
selecting typical dedicated features from the second dedicated features according to the recorded typical indexes;
inputting the typical dedicated features to the tracking model to predict target position in the image frame, wherein the tracking model is a DCF based tracking model; and
determining the track mark position according to the predicted target position; and
generating the tracking result according to the track mark position, wherein the tracking result includes a corresponding track mark position.

14. The video monitoring device of claim 8, wherein the step of inputting the image data into the detecting model to generate the detection results comprises:

inputting the image data to the single CNN to obtain features of the image frame;
determining, according to the features, one or more detect mark positions, detection scores, and one or more target objects' types;
generating the detection results according to the detect mark positions and the target objects' types;
wherein each of the detection result includes a corresponding detect mark position and corresponding tag information; and
wherein the tag information includes the target object's type of the corresponding detection result.

15. A system for detecting and tracking target object in a captured video using a single convolutional neural network, comprising:
a video monitoring device; and
a server, wherein the server comprises:
a processor,
wherein the video monitoring device sends object data via network established between the video monitoring device and the server, and the object data includes the captured video,
wherein the processor is configured to execute machine instructions to implement a method to detect and track the target object, and the method comprises:
generating, by a processor of the video monitoring device, image data according to an image frame of the captured video;
inputting, by the processor, the image data into a detecting model to generate zero or more detection results, wherein the detecting model is constructed by the single CNN;
inputting, by the processor, the image data into zero or more tracking models to generate one or more tracking results, wherein the tracking models use a part of the single CNN;
generating, by the processor, target detection results by selecting the detection results having first detection scores higher than a first detection threshold ($T_l$);
generating, by the processor, target tracking results by selecting the tracking results having first tracking scores higher than a first tracking threshold ($T_{corr}$);
performing, by the processor, a detection score enhancement operation to generate enhanced detection results according to the target detection results and the tracking results;
generating, by the processor, target enhanced detection results by selecting the enhanced detection results having second detection scores higher than a second detection threshold ($T_m$);
performing, by the processor, a matching operation on the target enhanced detection results and the target tracking results to generate matching outcomes;
wherein the matching outcomes comprises zero or more matched results, unmatched target detection results, and unmatched target tracking results;
wherein each of the matched results has a pair of matched target enhanced detection result and target tracking result; and
wherein the target object in the displayed image frame is marked according to the generated matching outcomes.

* * * * *